US010967510B2

(12) United States Patent
Kai et al.

(10) Patent No.: US 10,967,510 B2
(45) Date of Patent: Apr. 6, 2021

(54) ROBOT ARM PROCESSING SYSTEM AND METHOD THEREOF

(71) Applicant: INDUSTRIAL TECHNOLOGY RESEARCH INSTITUTE, Hsinchu (TW)

(72) Inventors: Chen-Yu Kai, Ligang Township, Pingtung County (TW); Kai-Ming Pan, Taoyuan (TW); Yen-Cheng Chen, Taichung (TW); Ta-Jen Peng, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 410 days.

(21) Appl. No.: 15/854,288

(22) Filed: Dec. 26, 2017

(65) Prior Publication Data

US 2019/0143511 A1    May 16, 2019

(30) Foreign Application Priority Data

Nov. 16, 2017 (TW) .................................. 106139788
Dec. 22, 2017 (CN) .......................... 201711415511.X

(51) Int. Cl.
*B25J 9/16* (2006.01)
*B25J 11/00* (2006.01)
*G05B 19/042* (2006.01)

(52) U.S. Cl.
CPC ........... *B25J 9/1641* (2013.01); *B25J 9/1633* (2013.01); *B25J 9/1694* (2013.01); *B25J 11/005* (2013.01);
(Continued)

(58) Field of Classification Search
CPC ...... B25J 9/1641; B25J 9/1633; B25J 11/005; B25J 9/1694; B25J 11/0055;
(Continued)

(56) References Cited

U.S. PATENT DOCUMENTS 3,474,747 A * 10/1969 Noiles .................... D05B 21/00
112/308
3,709,379 A * 1/1973 Kaufeldt .................. B25J 9/023
414/591
(Continued)

FOREIGN PATENT DOCUMENTS

CN     101195221 A     6/2008
CN     101462188 A     6/2009
(Continued)

OTHER PUBLICATIONS

JP2013007460A Description Translation (Year: 2013).*
(Continued)

*Primary Examiner* — Jeff A Burke
*Assistant Examiner* — Kyle T Johnson
(74) *Attorney, Agent, or Firm* — Muncy, Geissler, Olds & Lowe, P.C.

(57) ABSTRACT

A robot arm processing system includes a robot arm, a processing module, and a control module. The robot arm is for providing a mechanical holding force. The processing module is disposed on the robot arm to process a workpiece. The control module is connected to the robot arm or the processing module. The control module outputs an anti-vibration signal according to the reaction force of the workpiece or the displacement of the robot arm to counteract the reaction force of the workpiece or the displacement of the robot arm.

21 Claims, 7 Drawing Sheets

(52) U.S. Cl.
CPC ......... *B25J 11/0055* (2013.01); *G05B 19/042* (2013.01); *G05B 2219/37123* (2013.01); *G05B 2219/39199* (2013.01); *G05B 2219/39338* (2013.01); *Y10S 901/09* (2013.01); *Y10S 901/41* (2013.01); *Y10S 901/46* (2013.01)

(58) Field of Classification Search
CPC ........ G05B 19/042; G05B 2219/37123; G05B 2219/39199; G05B 2219/39338; Y10S 901/09; Y10S 901/46; Y10S 901/41
See application file for complete search history.

(56) References Cited

U.S. PATENT DOCUMENTS

| | | | |
|---|---|---|---|
| 4,346,444 A | 8/1982 | Schneider et al. | |
| 4,688,970 A | 8/1987 | Eckman | |
| 5,403,988 A * | 4/1995 | Kawada | B23K 11/0053 219/98 |
| 5,404,633 A | 4/1995 | Givler | |
| 5,599,142 A | 2/1997 | Fujimoto et al. | |
| 6,292,716 B1 * | 9/2001 | Moore, Jr. | B21D 5/002 318/568.11 |
| 6,357,100 B2 | 3/2002 | Dprllrt, Jr. et al. | |
| 6,650,960 B2 | 11/2003 | Kakino et al. | |
| 7,486,195 B2 * | 2/2009 | Collingwood | G01B 5/012 33/503 |
| 8,954,183 B2 * | 2/2015 | Kayani | B23K 26/03 700/114 |
| 2001/0033146 A1 * | 10/2001 | Kato | B25J 9/1641 318/568.22 |
| 2004/0074944 A1 * | 4/2004 | Okamoto | B23K 20/122 228/2.1 |
| 2006/0032843 A1 * | 2/2006 | Crouse | E04G 23/00 219/121.72 |
| 2006/0048364 A1 * | 3/2006 | Zhang | B23Q 17/0966 29/407.08 |
| 2006/0108958 A1 * | 5/2006 | Brenner | B25J 9/1641 318/432 |
| 2008/0065257 A1 * | 3/2008 | He | B23Q 17/09 700/175 |
| 2008/0140257 A1 * | 6/2008 | Sato | B25J 9/1633 700/258 |
| 2009/0259412 A1 * | 10/2009 | Brogardh | B25J 9/1633 702/41 |
| 2011/0218668 A1 * | 9/2011 | Morfino | G05B 19/401 700/174 |
| 2013/0180961 A1 * | 7/2013 | Goto | B23K 11/115 219/86.33 |
| 2014/0081461 A1 * | 3/2014 | Williamson | B25J 9/1643 700/261 |
| 2014/0316572 A1 * | 10/2014 | Iwatake | B25J 9/1633 700/258 |
| 2014/0316573 A1 * | 10/2014 | Iwatake | B25J 9/1694 700/258 |
| 2015/0081098 A1 * | 3/2015 | Kogan | B25J 9/1656 700/258 |
| 2015/0105907 A1 * | 4/2015 | Aiso | B25J 9/1697 700/259 |
| 2015/0248116 A1 * | 9/2015 | Kawaguchi | B25J 9/1687 700/245 |
| 2016/0184996 A1 * | 6/2016 | Ishige | B25J 9/1694 700/254 |
| 2016/0288327 A1 * | 10/2016 | Motoyoshi | B25J 9/1633 |
| 2016/0354933 A1 * | 12/2016 | Sato | B25J 9/1633 |
| 2017/0100841 A1 * | 4/2017 | Noda | G05B 19/423 |
| 2017/0329316 A1 * | 11/2017 | Morimura | B23B 3/065 |
| 2018/0169813 A1 * | 6/2018 | Wanner | B23Q 17/2233 |
| 2018/0236659 A1 * | 8/2018 | Hogan | B25J 9/1641 |
| 2019/0061143 A1 * | 2/2019 | Chandra | B25J 17/00 |
| 2019/0143511 A1 * | 5/2019 | Kai | B25J 9/1633 700/254 |
| 2019/0184564 A1 * | 6/2019 | Muraoka | B25J 9/1633 |
| 2019/0365488 A1 * | 12/2019 | Geiger | A61B 34/35 |

FOREIGN PATENT DOCUMENTS

| | | | |
|---|---|---|---|
| CN | 101920294 A | | 12/2010 |
| CN | 102717021 B | | 10/2012 |
| CN | 204108507 U | * | 1/2015 |
| CN | 204108507 U | | 1/2015 |
| CN | 104602873 A | | 5/2015 |
| CN | 105312632 A | | 2/2016 |
| CN | 105500147 A | | 4/2016 |
| CN | 106003101 A | | 10/2016 |
| CN | 106426173 A | | 2/2017 |
| CN | 107186460 A | | 9/2017 |
| JP | H 05111889 A | | 5/1993 |
| JP | 2001225286 A | * | 10/2001 |
| JP | 2013007460 A | * | 1/2013 |
| TW | 495413 | | 7/2002 |
| TW | I 337559 B | | 2/2011 |
| TW | M 545014 U | | 7/2017 |

OTHER PUBLICATIONS

JP2013007460A Translation (Year: 2013).*
CN204108507U Translation (Year: 2015).*
Hogan, "Impedance Control: An Approach to Manipulation", American Control Conference, Jun. 6-8, 1984, pp. 304-313.
Schneider et al., "Object Impedance Control for Cooperative Manipulation: Theory and Experimental Results", IEEE Transactions on Robotics and Automation, vol. 8, No. 3, Jun. 1992, pp. 383-394.
Slotine et al., "Adaptive Strategies in Constrained Manipulation", IEEE International Conference on Robotics and Automation. Proceedings, Mar. 1987, pp. 595-601.
Zeng et al., "An overview of robot force control", Robotica, vol. 15, 1997, pp. 473-482.
Anderson et al., Hybrid Impedance Control of Robotic Manipulators, IEEE Journal of Robotics and Automation, vol. 4, No. 5, Oct. 1988, pp. 549-556.
Lawrence, "Impedance Control Stability Properties in Common Implementations", IEEE International Conference on Robotics and Automation Proceedings, Apr. 24-29, 1988, pp. 1185-1190.
SIPO Office Action issued in corresponding Chinese application No. 201711415511 dated May 22, 2020.

* cited by examiner

ROBOT ARM PROCESSING SYSTEM AND METHOD THEREOF

This application claims the benefit of Taiwan application Serial No. 106139788, filed Nov. 16, 2017 and People's Republic of China application Serial No. 201711415511.X, filed Dec. 22, 2017, the disclosures of which are incorporated by reference herein in its entirety.

TECHNICAL FIELD

The disclosure relates in general to a processing system, and more particularly to a robot arm processing system and a method thereof.

BACKGROUND

The robot arm has a large degree of freedom and a large area of movement, and is flexible to use. However, the hardness of the robot arm is insufficient. If the robot arm is used to apply a force and directly process a workpiece, the robot arm may be deformed by the reaction force, and the processing precision of the robot arm will be affected.

Therefore, how to avoid the robot arm being deformed and increase the processing precision of the robot arm processing system has become a prominent task for the industries.

SUMMARY

The disclosure is directed to a robot arm processing system and a method thereof.

According to one embodiment, a robot arm processing system is provided. The robot arm processing system includes a robot arm, a processing module and a control module. The robot arm is for providing a mechanical holding force. The processing module is disposed on the robot arm for processing a workpiece. The control module is connected to the robot arm or the processing module for outputting an anti-vibration signal according to the reaction force of the workpiece or the displacement of the robot arm to counteract the reaction force of the workpiece or the displacement of the robot arm.

According to one embodiment, a robot arm processing method including following steps is provided. A mechanical holding force is provided by a robot arm. A workpiece is processed by a processing module disposed on the robot arm, wherein the processing module includes a feeder unit and a pre-pressing unit, the feeder unit includes a tool for processing the workpiece, the pre-pressing unit is connected to the robot arm, and the mechanical holding force having a direction inverse to a direction of the reaction force of the workpiece is applied to the workpiece through the pre-pressing unit. The robot arm is connected to a control module which outputs an anti-vibration signal according to the reaction force of the workpiece or the displacement of the robot arm to counteract the reaction force of the workpiece or the displacement of the robot arm.

According to one embodiment, a robot arm processing method including following steps is provided. A mechanical holding force is provided by a robot arm. A workpiece is processed by a processing module disposed on the robot arm, wherein the processing module includes a feeder unit, a pre-pressing unit, a sensing unit and an impedance simulation unit, the feeder unit includes a tool for processing the workpiece, the pre-pressing unit is connected to the robot arm, the mechanical holding force having a direction inverse to a direction of the reaction force of the workpiece is applied to the workpiece through the pre-pressing unit, the sensing unit is connected to the feeder unit for detecting a loading signal outputted by the feeder unit when processing the workpiece, the impedance simulation unit is disposed between the feeder unit and the robot arm for evaluating the reaction force of the workpiece according to the loading signal outputted by the feeder unit to output a virtual impedance. The impedance simulation unit is connected to a control module which outputs an anti-vibration signal according to the virtual impedance to counteract the reaction force of the workpiece.

The above and other aspects of the invention will become better understood with regard to the following detailed description of the embodiment(s). The following description is made with reference to the accompanying drawings.

Figure 1A:
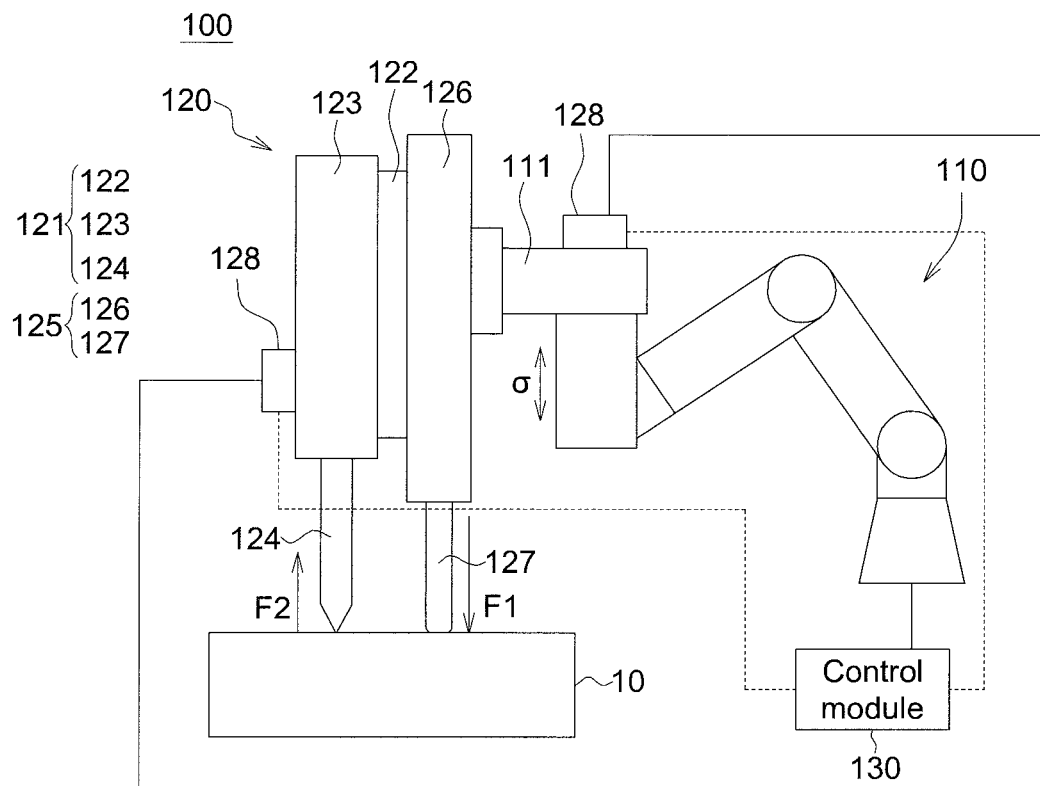
FIG. 1A is a configuration diagram of a robot arm processing system according to an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

First Embodiment

Figure 1B:
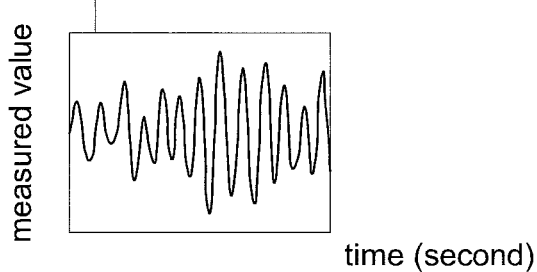
FIGS. 1B and 1C are schematic diagrams of the measured values of sensing units respectively.
Figure 1C:
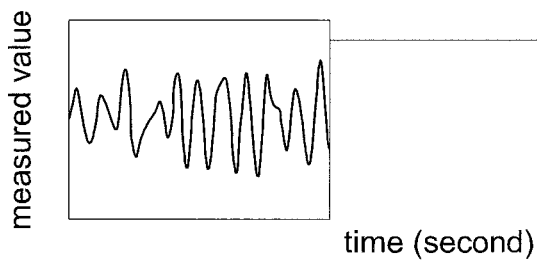

FIG. 1A is a configuration diagram of a robot arm processing system 100 according to an embodiment of the invention. FIGS. 1B and 1C are schematic diagrams of the measured values of sensing units 128 respectively. In the present embodiment, the robot arm processing system 100 includes a robot arm 110, a processing module 120 and a control module 130. The processing module 120 includes a feeder unit 121, a pre-pressing unit 125 and at least one sensing unit 128.

Refer to FIG. 1A. According to an embodiment of the invention, the feeder unit 121 is for applying a processing force to the workpiece 10. The feeder unit 121 includes a driver 122, a spindle motor 123 and a tool 124. The tool 124, such as a cutting tool, a drilling tool, a milling cutter or a boring knife, is disposed on a shaft of the spindle motor 123. The driver 122 is for driving the spindle motor 123 and the tool 124 to move towards the workpiece 10 to process the workpiece 10. The driver 122 can be a pneumatic cylinder assembly, a linear motor assembly or a lead screw assembly. In the present embodiment, the feeder unit 121 is not limited to a uni-axial feeder unit, and can also be realized by a multi-axial feeder unit or a feeder unit having multi-degree of freedoms.

According to an embodiment of the invention, the feeder unit 121 is disposed on the pre-pressing unit 125. The pre-pressing unit 125 is connected to the robot arm 110, so that the robot arm 110 can apply a pre-pressing force to the workpiece 10 through the pre-pressing unit 125. The pre-pressing unit 125 includes a holding platform 126 and at least one pre-pressing rod 127, the holding platform 126 is fixed on the terminal portion 111 of the robot arm 110, and the pre-pressing rod 127 is disposed on one side of the holding platform 126 near the workpiece 10, so that the pre-pressing rod 127 can fixedly abut between the holding platform 126 and the workpiece 10 to be processed. In an embodiment, the hardness of the pre-pressing rod 127 is larger than that of the robot arm 110. Thus, the pre-pressing rod 127 can bear a larger reaction force F2 than the robot arm 110 and will not be deformed easily.

According to an embodiment of the invention, the sensing unit 128, such as a force sensor or a position sensor, is for detecting a reaction force F2 of the workpiece 10 or the displacement of the robot arm 110. The sensing unit 128 can be disposed on the feeder unit 121 or the robot arm 110. In another embodiment, the sensing unit 128 having a force sensing function or a position sensing function can be disposed on the feeder unit 121 and the robot arm 110 respectively, and the invention is not limited thereto.

Refer to FIG. 1A. The mechanical holding force F1 provided by the robot arm 110 has a direction inverse to that of the reaction force F2 of the workpiece 10 and a magnitude larger than that of the reaction force F2 of the workpiece 10, that is, F1>F2. Besides, the mechanical holding force F1 provided by the robot arm 110 deducts the reaction force F2 of the workpiece 10 is equivalent to the pre-pressing force applied to the workpiece 10 by the pre-pressing rod 127.

According to an embodiment of the invention, the control module 130 is for receiving a measured value obtained by detecting a reaction force F2 of the workpiece 10 or the displacement of the robot arm 110 through the sensing unit 128 and for adjusting the mechanical holding force F1 provided by the robot arm 110 according to the measured value. For example, when it is detected that the reaction force F2 of the workpiece 10 (referring to the measured values of FIG. 1B) or the displacement of the robot arm 110 (referring to the measured values of FIG. 1C) is a periodic shock wave, to avoid the processing precision of the processing system 100 being affected by the periodic shock wave, the control module 130 is connected to the robot arm 110 for outputting an anti-vibration signal a to the robot arm 110 to counteract the vibration generated by the reaction force F2 of the workpiece 10 or the displacement of the robot arm 110. The anti-vibration signal a has a direction inverse to the direction of the reaction force F2 of the workpiece 10 or inverse to the direction of the displacement of the robot arm 110, and the anti-vibration signal a has a magnitude equivalent to the magnitude of the reaction force F2 of the workpiece 10 or equivalent to the displacement of the robot arm 110.

Second Embodiment

Figure 2A:
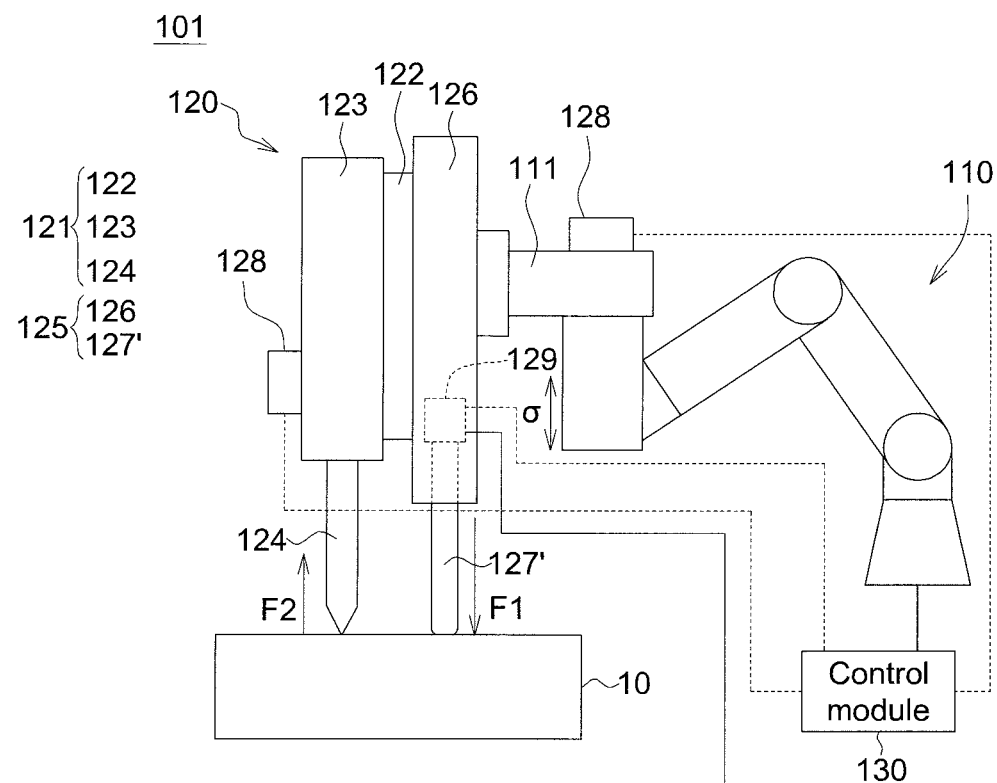
FIG. 2A is a configuration diagram of a robot arm processing system according to another embodiment of the invention.
Figure 2B:
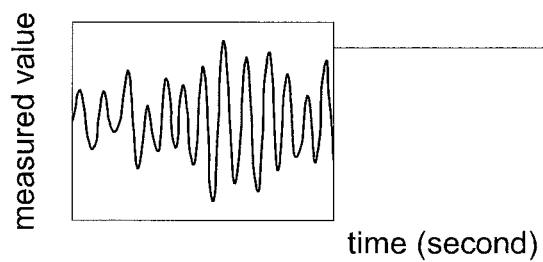
FIG. 2B is a schematic diagram of the measured values of a sensing unit.
Figure 3A:
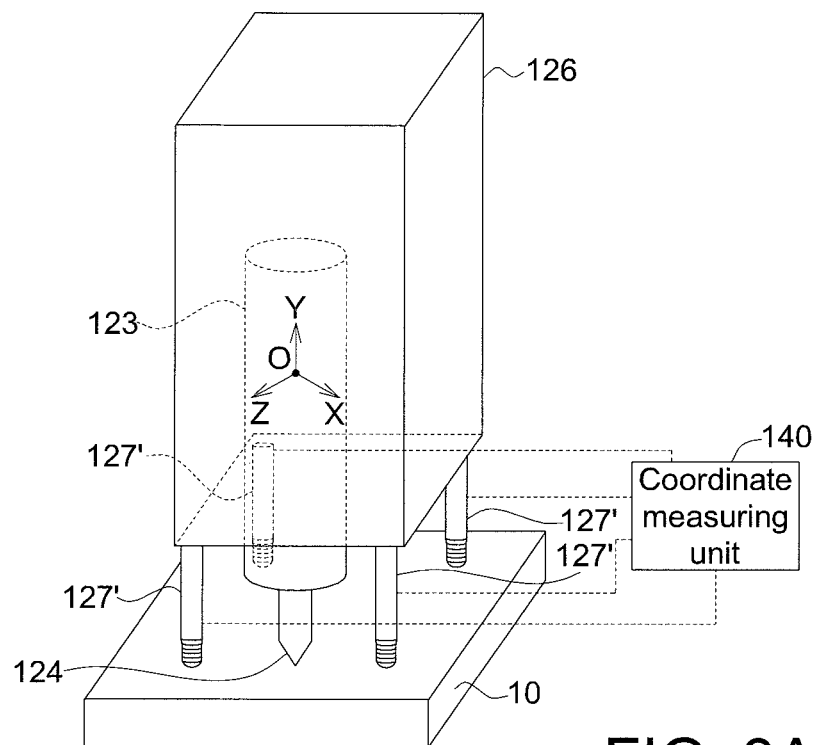
FIGS. 3A and 3B are schematic diagrams of a length variable pre-pressing rod according to an embodiment of the invention.
Figure 3B:
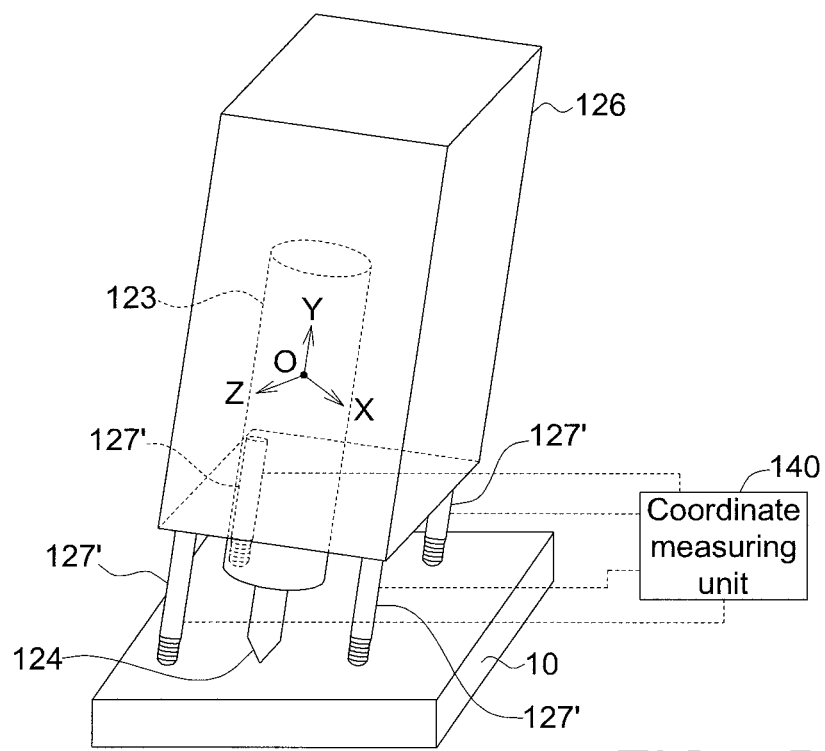

FIG. 2A is a configuration diagram of a robot arm processing system 101 according to another embodiment of the invention. FIG. 2B is a schematic diagram of the measured values of a sensing unit 129. FIGS. 3A and 3B are schematic diagrams of a length variable pre-pressing rod 127' according to an embodiment of the invention. In the present embodiment, the robot arm processing system 101 includes a robot arm 110, a processing module 120 and a control module 130. The processing module 120 includes a feeder unit 121, a pre-pressing unit 125 and at least one sensing unit 129.

The present embodiment is different from above embodiments in that: the pre-pressing unit 125 includes at least one length variable pre-pressing rod 127', and the length variation of the pre-pressing rod 127' or the positive force applied to the pre-pressing rod 127' (the positive force=KX, K is a coefficient of elasticity, X is a length variation) is related to the displacement of the robot arm 110. Thus, the displacement of the robot arm 110 can be obtained from the length variation of the pre-pressing rod 127' or the forward force applied to the pre-pressing rod 127'.

In the present embodiment, the sensing unit 129, such as a force sensor or a position sensor, obtains a measured value by detecting a length variation of the pre-pressing rod 127', and the control module 130, through the sensing unit 129, adjusts the mechanical holding force F1 provided by the robot arm 110 according to the measured value. For example, when it is detected that the length variation of the pre-pressing rod 127' (referring to the measured values of FIG. 2B) is a periodic shock wave, to avoid the processing precision of the processing system 101 being affected by the periodic shock wave, the control module 130 is connected to the robot arm 110 for outputting an anti-vibration signal a to the robot arm 110 to counteract the vibration generated by the reaction force F2 of the workpiece 10 or the displacement of the robot arm 110. The anti-vibration signal σ has a direction inverse to the direction of the length variation of the pre-pressing rod 127', and the anti-vibration signal σ has a magnitude equivalent to the magnitude of the length variation of the pre-pressing rod 127'.

The sensing unit 128 of the first embodiment can be used separately or in conjunction with the sensing unit 129 of the second embodiment, and the invention is not limited thereto.

Refer to FIGS. 3A and 3B. In the present embodiment, the processing module 120 further includes a coordinate measuring unit 140 for detecting a length of the pre-pressing rod 127' to obtain a coordinate value of the geometric center O of the pre-pressing unit 125 (or the holding platform 126). Thus, the control module 130 can determine whether the posture of the holding platform 126 is changed according to the displacement of the geometric center O of the holding platform 126. As indicated in FIGS. 3A and 3B, the pre-pressing unit 125 includes three or more than three length variable pre-pressing rods 127'. When it is detected that the length variable pre-pressing rods 127' have the same length with respect to the workpiece 10, the geometric center O of the holding platform 126 has a first coordinate value in the three-dimensional coordinate system (X, Y, Z). When it is detected that the four pre-pressing rod 127 have different lengths with respect to the workpiece 10, the geometric center O of the holding platform 126 has a second coordinate value in the three-dimensional coordinate system (X,Y,Z). The control module 130 calculates the displacement between the first coordinate value and the second coordinate value using coordinate transformation to obtain the posture of the holding platform 126, and further adjusts the robot arm 110 to change the posture of the holding platform 126.

Third Embodiment

Figure 4:
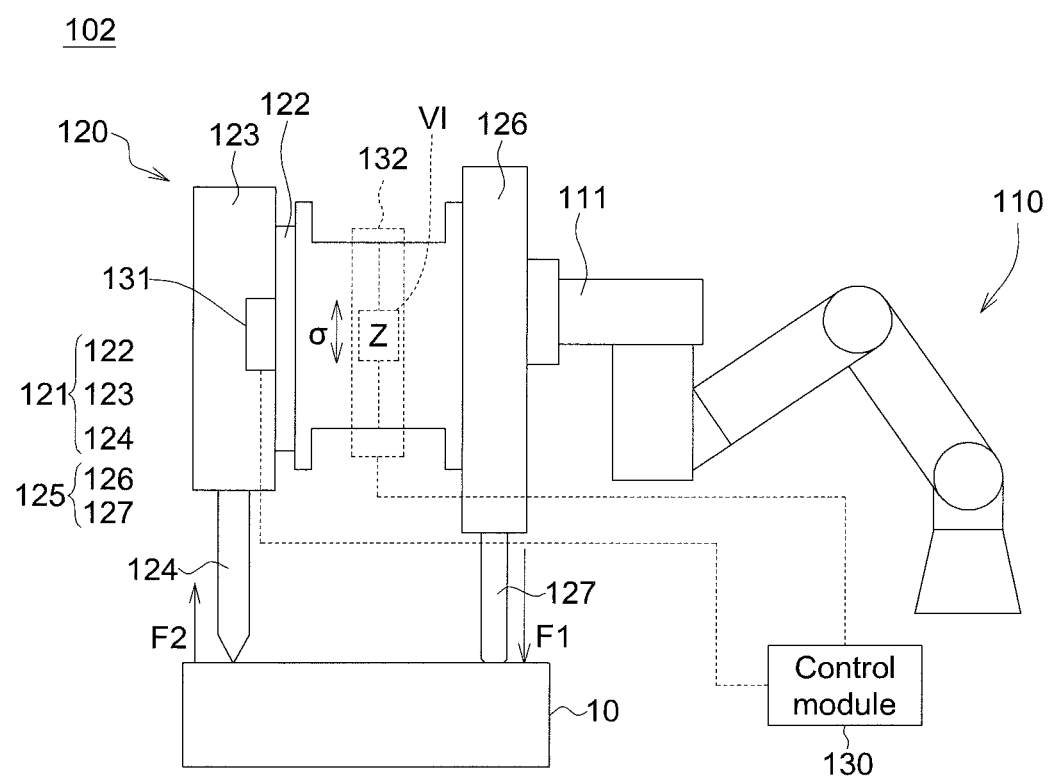
FIG. 4 is a configuration diagram of a robot arm processing system according to another embodiment of the invention.

FIG. 4 is a configuration diagram of a robot arm processing system 102 according to another embodiment of the invention. In the present embodiment, the robot arm processing system 102 includes a robot arm 110, a processing module 120 and a control module 130. The processing module 120 includes a feeder unit 121, a pre-pressing unit 125, a sensing unit 131 and an impedance simulation unit 132.

The present embodiment is different from above embodiments in that: the sensing unit 131, such as a current meter or a voltmeter, is connected to the feeder unit 121, and can be disposed in the interior or the exterior of the feeder unit 121 for detecting a loading signal outputted by the feeder unit 121 when processing the workpiece 10, the loading signal is such as a current signal, a voltage signal or an inductance signal, and the processing force applied to the workpiece 10 by the feeder unit 121 is positively proportional to the loading signal.

Moreover, the impedance simulation unit 132 is disposed between the feeder unit 121 and the pre-pressing unit 125 (or the robot arm 110). The impedance simulation unit 132 evaluates the reaction force F2 of the workpiece 10 according to the loading signal outputted by the feeder unit 121 to generate a virtual impedance VI. The control module 130 outputs an anti-vibration signal a according to the virtual impedance VI to counteract the vibration generated by the reaction force F2 of the workpiece 10, and therefore enhances the processing precision of the processing system 100.

The impedance simulation unit 132, such as an impedance simulation unit 132, pre-evaluates the reaction force F2 of the workpiece 10. When it is detected that the reaction force F2 of the workpiece 10 is a periodic shock wave, to avoid the processing precision of the processing system 102 being affected by the periodic shock wave, the control module 130 is connected to the impedance simulation unit 132 for outputting an anti-vibration signal σ to the feeder unit 121 to counteract the vibration generated by the reaction force F2 of the workpiece 10, and therefore increase the stability of the processing system 102. The anti-vibration signal σ has a direction inverse to the direction of the reaction force F2 of the workpiece 10, and the anti-vibration signal σ has a magnitude equivalent to the magnitude of the reaction force F2 of the workpiece 10.

The sensing unit 128 of the first embodiment, the sensing unit 129 of the second embodiment can be used separately or in conjunction with the sensing unit 131 of the third embodiment, and the invention is not limited thereto.

Fourth Embodiment

Figure 5A:
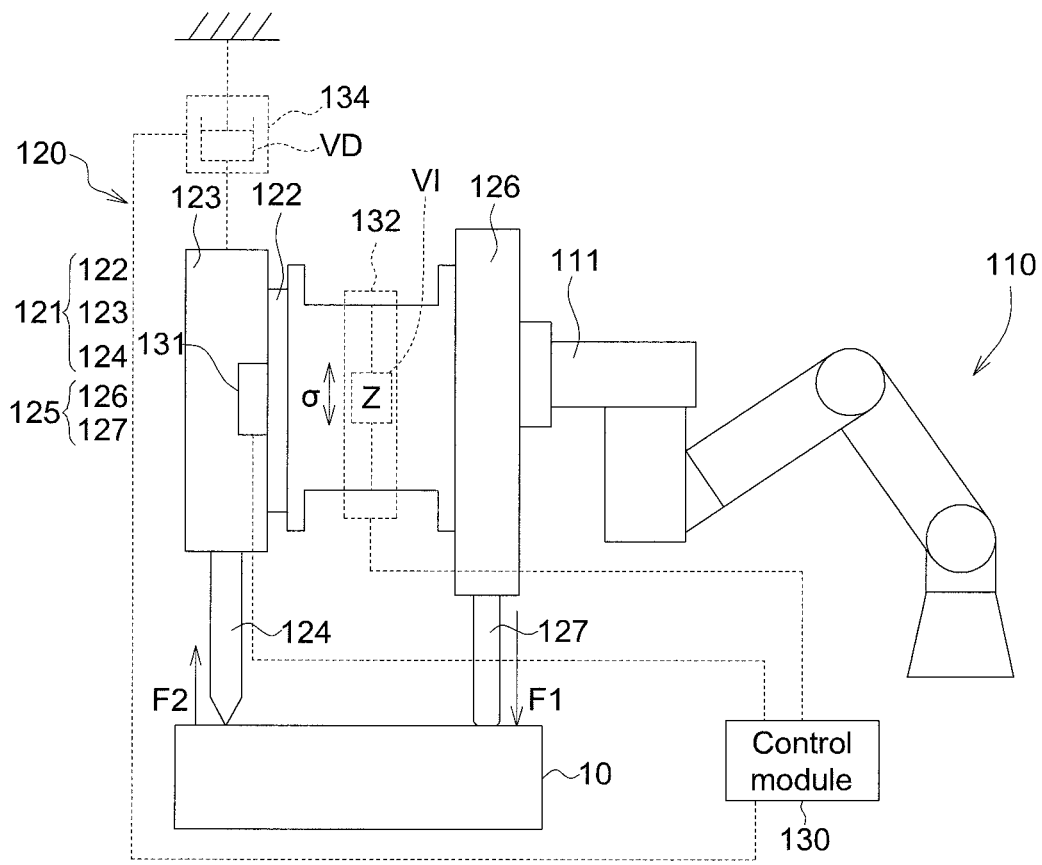
FIGS. 5A and 5B respectively are configuration diagrams of a robot arm processing system according to another embodiment of the invention.
Figure 5B:
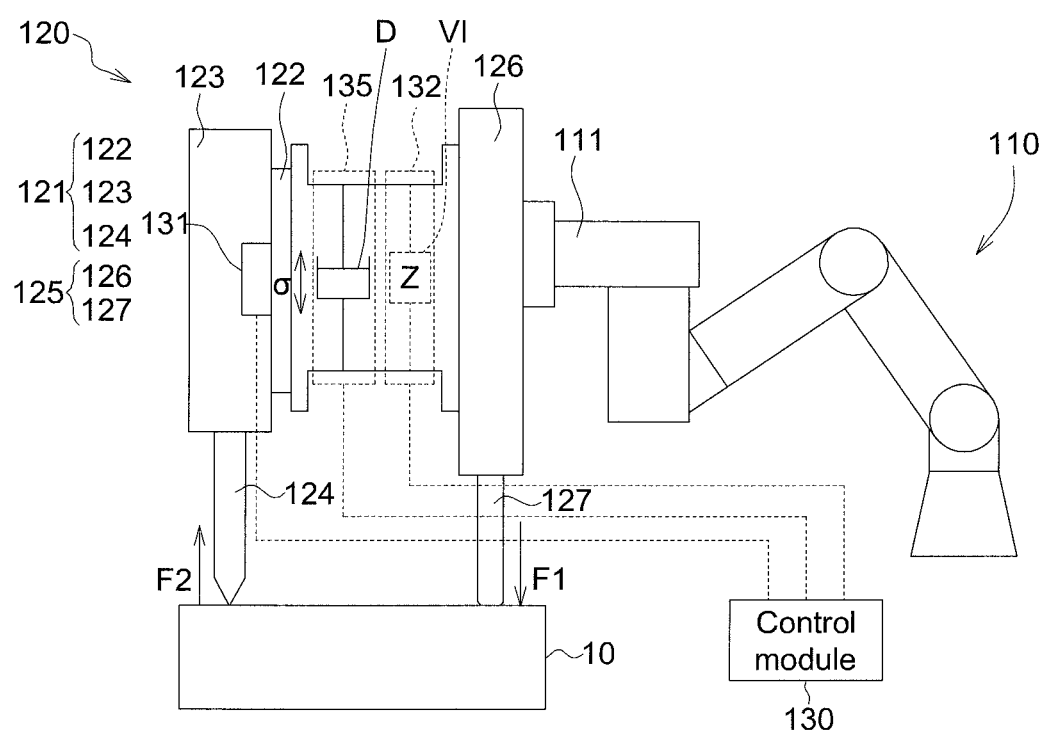

FIGS. 5A and 5B respectively are a configuration diagram of a robot arm processing system 103 and a robot arm processing system 103' according to another embodiment of the invention. In FIGS. 5A and 5B, each of the robot arm processing systems 103 and 103' includes a robot arm 110, a processing module 120 and a control module 130. The processing module 120 includes a feeder unit 121, a pre-pressing unit 125, a sensing unit 131, an impedance simulation unit 132 and at least one damping unit. In FIG. 5A, the damping unit can be a skyhook damping unit 134. In FIG. 5B, the damping unit can be a damper 135.

The present embodiment is different from above embodiments in that: the skyhook damping unit 134 is for hanging the feeder unit 121 in the air and providing a virtual damping VD to the spindle motor 123 of the feeder unit 121 to reduce the vibration of the spindle motor 123, and therefore increase the stability of the spindle motor 123. The skyhook damping unit 134 can be a hydraulic cylinder, a pneumatic cylinder or a suspension spring. In the present embodiment, the skyhook damping unit 134 can be used separately or in conjunction with the impedance simulation unit 132. When the skyhook damping unit 134 and the impedance simulation unit 132 are used in conjunction, the vibration of the spindle motor 123 can be reduced and the vibration generated by the reaction force F2 of the workpiece 10 can be counteracted. Besides, in FIG. 5B, the vibration of the robot arm 110 and the pre-pressing unit 125 generated by an external mechanic force (such as machine vibration) may indirectly make the feeder unit 121 vibrate. To avoid the stability of the processing system 103 being affected, the damper 135 can be disposed between the feeder unit 121 and the pre-pressing unit 125 (or the robot arm 110) to buffer the vibration of the spindle motor 123 generated by the external mechanic force, and therefore increase the stability of the processing system 103. The damper 135 is for providing a damping value D and can be used in conjunction with the impedance simulation unit 132. The damper 135 can be a hydraulic cylinder, a pneumatic cylinder or a suspension spring.

In FIG. 5A, the control module 130 is connected to the impedance simulation unit 132 and the skyhook damping unit 134 for outputting an anti-vibration signal a to the feeder unit 121 according to the virtual impedance VI and the virtual damping VD to counteract the vibration generated by the reaction force F2 of the workpiece 10 and the vibration of the spindle motor 123 itself, and therefore increase the processing precision and stability of the processing system 103. In FIG. 5B, the control module 130 is connected to the impedance simulation unit 132 and the damper 135 for outputting an anti-vibration signal σ according to the virtual impedance VI and the damping value D to counteract the vibration generated by the reaction force F2 of the workpiece 10 and the interference of external vibration, and therefore increase the processing precision and stability of the processing system 103'. The anti-vibration signal σ has a direction inverse to the direction of the reaction force F2 of the workpiece 10 and has a magnitude equivalent to the magnitude of the reaction force F2 of the workpiece 10.

Fifth Embodiment

Figure 6:
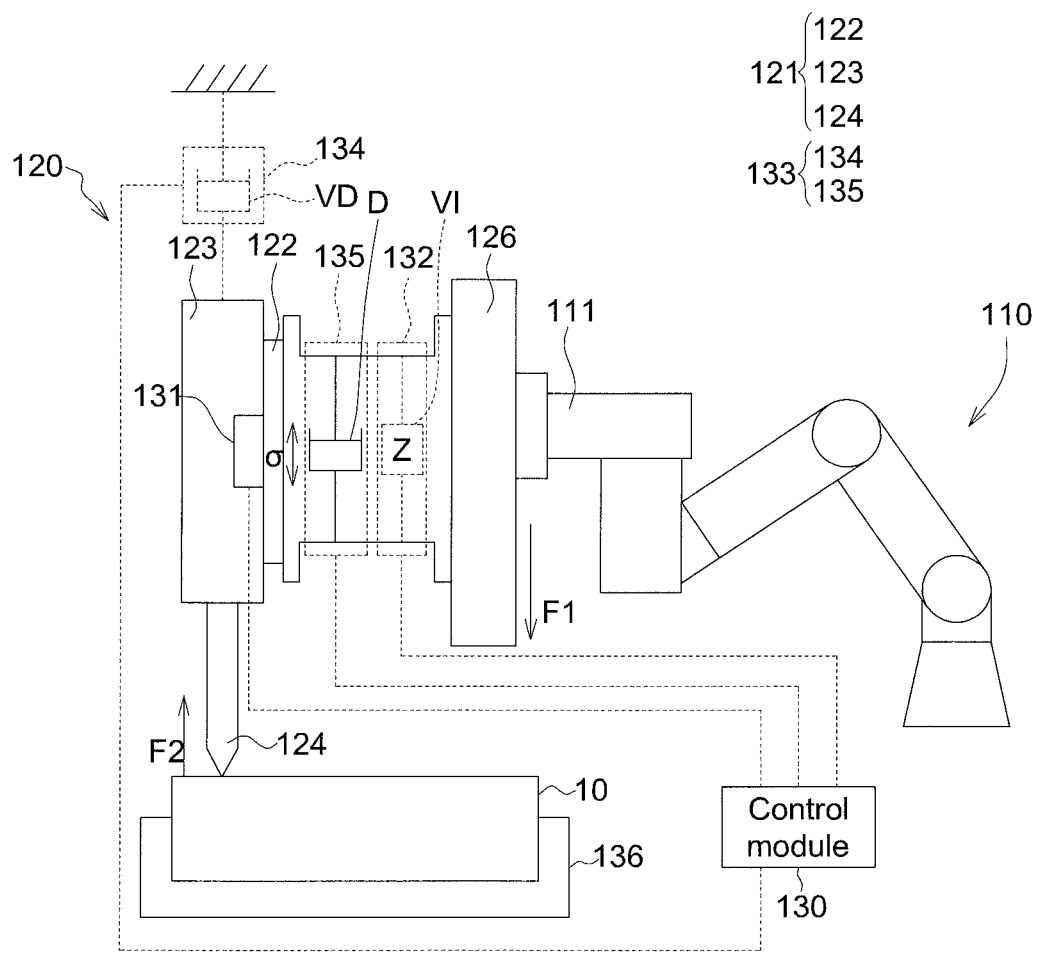
FIG. 6 is a configuration diagram of a robot arm processing system according to another embodiment of the invention.

FIG. 6 is a configuration diagram of a robot arm processing system 104 according to another embodiment of the invention. In present embodiment, the robot arm processing system 104 includes a robot arm 110, a processing module 120 and a control module 130. The processing module 120 includes a feeder unit 121, a sensing unit 131, an impedance simulation unit 132 and at least one damping unit 133.

The present embodiment is different from above embodiments in that: the workpiece 10 is fixed by a holding force of a fastening structure or a clamping structure 136, and the robot arm 110 does not apply a pre-pressing force to the workpiece using the pre-pressing rod 127 as disclosed in above embodiments. Moreover, the damping unit 133 includes a skyhook damping unit 134 and a damper 135, and is used in conjunction with the impedance simulation unit 132. The control module 130 is connected to the impedance simulation unit 132 and the damping unit 133 for outputting an anti-vibration signal σ to the feeder unit 121 according to the virtual impedance VI, the virtual damping VD and the damping value D to reduce the vibration of the spindle motor 123, counteract the vibration generated by the reaction force F2 of the workpiece 10, and buffer the vibration of the spindle motor 123 generated by the external mechanic force, and therefore increase the processing precision and stability of the processing system 104. The anti-vibration signal σ has a direction inverse to the direction of the reaction force F2 of the workpiece 10 and has a magnitude equivalent to the magnitude of the reaction force F2 of the workpiece 10.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A robot arm processing system, comprising:
a robot arm for providing a mechanical holding force;
a processing module disposed on the robot arm for processing a workpiece; and
a control module connected to the processing module for outputting an anti-vibration signal according to a reaction force of the workpiece to counteract the reaction force of the workpiece;
wherein, the processing module comprises a feeder unit and a pre-pressing unit, the feeder unit comprises a tool and a driver for driving the tool to process the workpiece, the pre-pressing unit connects between the robot arm and the feeder unit, the pre-pressing unit comprises a holding platform for holding the feeder unit and a plurality of pre-pressing rods, and the mechanical holding force is applied to the workpiece through the plurality of pre-pressing rods,
wherein the control module determines a posture of the holding platform according to a displacement of a geometric center of the holding platform, when it is detected that the pre-pressing rods have same length with respect to the workpiece, the geometric center of the holding platform has a first coordinate value, and when it is detected that the pre-pressing rods have different lengths with respect to the workpiece, the geometric center of the holding platform has a second coordinate value different from the first coordinate value,
wherein a hardness of the pre-pressing rod is greater than a hardness of the robot arm, and the mechanical holding force is greater than the reaction force of the workpiece.

2. The robot arm processing system according to claim 1, wherein a direction of the mechanical holding force is inverse to a direction of the reaction force of the workpiece.

3. The robot arm processing system according to claim 2, wherein the pre-pressing rods comprise length variable pre-pressing rods.

4. The robot arm processing system according to claim 3, further comprising at least one sensing unit disposed on the pre-pressing unit for detecting a length variation of each of the length variable pre-pressing rods.

5. The robot arm processing system according to claim 4, wherein the processing module further comprises a coordinate measuring unit for detecting a length of each of the length variable pre-pressing rods to obtain a coordinate value of the pre-pressing unit.

6. The robot arm processing system according to claim 1, further comprising at least one sensing unit disposed on the processing module or the robot arm for detecting the reaction force of the workpiece or the displacement of the robot arm; wherein, the mechanical holding force having a direction inverse to a direction of the reaction force of the workpiece is applied to the workpiece through the pre-pressing unit.

7. The robot arm processing system according to claim 1, further comprising at least one sensing unit connected to the feeder unit for detecting a loading signal outputted by the feeder unit when the feeder unit processes the workpiece.

8. The robot arm processing system according to claim 7, further comprising an impedance simulation unit disposed between the feeder unit and the robot arm for evaluating the reaction force of the workpiece according to the loading signal outputted by the feeder unit.

9. The robot arm processing system according to claim 8, wherein the impedance simulation unit is an active impedance simulation unit used for generating a virtual impedance.

10. The robot arm processing system according to claim 9, further comprising a skyhook damping unit connected to the feeder unit for hanging the feeder unit and providing a virtual damping to the feeder unit.

11. The robot arm processing system according to claim 10, further comprising a damper disposed between the feeder unit and the robot arm.

12. The robot arm processing system according to claim 11, further comprising a clamping structure connected to the workpiece for providing a holding force to the workpiece.

13. A robot arm processing method, comprising:
providing a mechanical holding force by a robot arm;
processing a workpiece by a processing module disposed on the robot arm, wherein the processing module comprises a feeder unit and a pre-pressing unit, the feeder unit comprises a tool and a driver for driving the tool to process the workpiece, the pre-pressing unit connects between the robot arm and the feeder unit, the pre-pressing unit comprises a holding platform for holding the feeder unit and a plurality of pre-pressing rods, and the mechanical holding force is applied to the workpiece through the plurality of pre-pressing rods, and the mechanical holding force having a direction inverse to a direction of a reaction force of the workpiece is applied to the workpiece through the pre-pressing unit, wherein a hardness of the pre-pressing rod is greater than a hardness of the robot arm, and the mechanical holding force is greater than the reaction force of the workpiece; and
connecting a control module to the processing module for outputting an anti-vibration signal according to the reaction force of the workpiece to counteract the reaction force of the workpiece, wherein a posture of the holding platform is determined by the control module according to a displacement of a geometric center of the holding platform, when it is detected that the pre-pressing rods have same length with respect to the workpiece, the geometric center of the holding platform has a first coordinate value, and when it is detected that the pre-pressing rods have different lengths with respect to the workpiece, the geometric center of the holding platform has a second coordinate value different from the first coordinate value.

14. The robot arm processing method according to claim 13, further comprising:
   disposing at least one sensing unit on the pre-pressing unit, and the pre-pressing rods comprising length variable pre-pressing rods; and
   detecting a length variation of each of the length variable pre-pressing rods by the at least one sensing unit.

15. The robot arm processing method according to claim 14, further comprising disposing a coordinate measurement unit on the processing module for detecting a length of each of the length variable pre-pressing rods to obtain a coordinate value of the pre-pressing unit.

16. The robot arm processing method according to claim 13, further comprising disposing at least one sensing unit on the processing module or the robot arm for detecting the reaction force of the workpiece or the displacement of the robot arm.

17. A robot arm processing method, comprising:
   providing a mechanical holding force by a robot arm;
   processing a workpiece by a processing module disposed on the robot arm, wherein the processing module comprises a feeder unit, a pre-pressing unit, a sensing unit and an impedance simulation unit, the feeder unit comprises a tool and a driver for driving the tool to process the workpiece, the pre-pressing unit connects between the robot arm and the feeder unit, the pre-pressing unit comprises a holding platform for holding the feeder unit and a plurality of pre-pressing rods, and the mechanical holding force is applied to the workpiece through the plurality of pre-pressing rods, the mechanical holding force having a direction inverse to a direction of a reaction force of the workpiece is applied to the workpiece through the pre-pressing unit, wherein a hardness of the pre-pressing rod is greater than a hardness of the robot arm, and the mechanical holding force is greater than the reaction force of the workpiece, the sensing unit is connected to the feeder unit for detecting a loading signal outputted by the feeder unit when the feeder unit processes the workpiece, and the impedance simulation unit is disposed between the feeder unit and the robot arm for evaluating the reaction force of the workpiece according to the loading signal outputted by the feeder unit to output a virtual impedance; and
   connecting a control module to the impedance simulation unit for outputting an anti-vibration signal according to the virtual impedance to counteract the reaction force of the workpiece, wherein a posture of the holding platform is determined by the control module according to a displacement of a geometric center of the holding platform, when it is detected that the pre-pressing rods have same length with respect to the workpiece, the geometric center of the holding platform has a first coordinate value, and when it is detected that the pre-pressing rods have different lengths with respect to the workpiece, the geometric center of the holding platform has a second coordinate value different from the first coordinate value.

18. The robot arm processing method according to claim 17, wherein the impedance simulation unit is an active impedance simulation unit.

19. The robot arm processing method according to claim 17, further comprising disposing a skyhook damping unit connected to the feeder unit for hanging the feeder unit and providing a virtual damping to the feeder unit.

20. The robot arm processing method according to claim 17, further comprising disposing a damper between the feeder unit and the robot arm.

21. The robot arm processing method according to claim 17, further comprising:
   disposing a skyhook damping unit connected to the feeder unit for hanging the feeder unit and providing a virtual damping to the feeder unit and disposing a damper between the feeder unit and the robot arm.

* * * * *